United States Patent Office 3,461,131
Patented Aug. 12, 1969

3,461,131
PROCESS FOR PREPARING 2-SUBSTITUTED
CYCLOHEPTIMIDAZOLE DERIVATIVES
Genshun Sunagawa, Nobuo Soma, Junichi Nakazawa,
and Mitsuo Watatani, Tokyo, Japan, assignors to
Sankyo Company Limited, Chyuo-ku, Tokyo, Japan
No Drawing. Filed Sept. 8, 1965, Ser. No. 485,913
Claims priority, application Japan, Sept. 14, 1964,
39/52,520
Int. Cl. C07d 49/38
U.S. Cl. 260—309  2 Claims

ABSTRACT OF THE DISCLOSURE

A process for preparing a compound having the formula

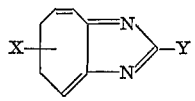

wherein X represents hydrogen, lower alkyl, phenyl, halogen, nitro, or lower alkoxy, and Y represents unsubstituted or substituted amino, lower alkoxy, lower alkylthio, or a group of the formula

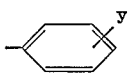

in which y represents hydrogen, lower alkyl, halogen, nitro, hydroxy, dialkylamino, with lower alkyl in each substitutent, or lower alkoxy, which comprises reacting a compound having the formula

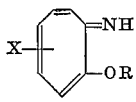

wherein X is as defined above and R represents lower alkyl, with a compound having the formula

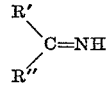

wherein R' represents an unsubstituted or substituted amino, lower alkoxy, lower alkylthio, or a group of the formula

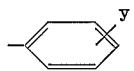

wherein y has the same meaning as defined above, and R" represents amino, or R' and R" jointly may be imino substituted with alkyl or aryl. In "lower alkyl," "lower alkoxy," etc., the expression "lower" is intended to mean 1–5 C-atoms. The compounds produced are known and have been found to be valuable intermediates in the synthesis of efficient analgesics and anti-inflammatory agents.

SUMMARY OF THE INVENTION

More particularly, the invention relates to a novel process for preparing 2-substituted cycloheptimidazole derivatives having formula

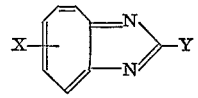

wherein X represents hydrogen; alkyl of 1–5 carbon atoms such as methyl, ethyl, propyl, isopropyl, isobutyl or isoamyl; phenyl; halogen atom; nitro; or an alkoxy of 1–5 carbon atoms such as methoxy or ethoxy, Y represents amino unsubstituted or substituted with alkyl, aryl or arakyl such as monoalkylamino, for example monomethylamino or monoethylamino, dialkylamino, for example dimethylamino or diethylamino, arylamino, for example anilino or aralkylamino, for example benzylamino; alkoxy of 1–5 carbon atoms, such as methoxy or ethoxy; alkylthio of 1–5 carbon atoms, such as methylthio or ethylthio; or a group of the formula

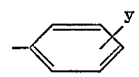

(in which y represents hydrogen, alkyl of 1–5 carbon atoms, halogen, nitro, hydroxy, a dialkylamino of 1–5 carbon atoms in each alkyl moiety, or alkoxy of 1–5 carbon atoms), such as phenyl, p-methylphenyl, p-bromophenyl, p-nitrophenyl, m-nitrophenyl, p-hydroxyphenyl, p-dimethylaminophenyl or p-methoxyphenyl. More specifically, it relates to a novel process for preparing 2-aminocycloheptimidazole derivatives having the formula

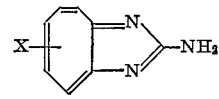

(Ia)

wherein X is as defined above.

The cycloheptimidazole derivatives having the above Formula I prepared by the process according to this invention are known compounds and they have been found by us to be a valuable intermediate for the synthesis of efficient analgesic and anti-inflammatory agents.

More particularly, the cycloheptimidazole derivatives having the above Formula Ia are particularly suitable intermediates for synthesizing certain valuable analgesic and anti-inflammatory agents. For example, the 2-amino cycloheptimidazole derivative is hydrolysed with a suitable acid such as hydrochloric acid to produce the corresponding cycloheptimidazol-2(H)-one and the latter compound is reacted with benzyl chloride to yield the corresponding 1-benzylcycloheptimidazol-2(1H)-one that has already been found by us to possess surprisingly potent analgesic and anti-inflammatory activities as disclosed in Belgian Patent No. 624,446 granted to Genshun Sunagawa et al. on Nov. 30, 1962.

Heretofore, 2-aminocycloheptimidazole derivatives have been prepared from 2-aminotropones by the process comprising three steps; that is, the step of treatment with alkali, that of treatment with diazomethane followed by that of condensation with formamidine derivatives, such as guanidine or O-ethylisourea. However, the prior process can not be regarded as a commercially advantageous one, because a number of steps are required and there is considerable danger owing to use of diazomethane as a reagent.

As the result of various investigations in order to find out a simple and beneficial process for preparing the 2-substituted cycloheptimidazole derivatives, it has now unexpectedly found that the cycloheptimidazole derivatives having the above Formula I can be advantageously prepared by reacting 2-alkoxytroponeimine having the formula

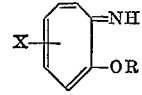

(II)

wherein X is as defined above and R represents alkyl of 1–5 carbon atoms such as methyl, ethyl, propyl, isobutyl or n-amyl with cyanamide or an alkali or alkaline earth metal salt thereof or a compound having the formula

 (III)

wherein R' represents amino unsubstituted or substituted with alkyl, aryl or aralkyl such as monoalkylamino, for example monomethylamino or monoethylamino, dialkylamino for example dimethylamino or diethylamino, arylamino, for example anilino or aralkylamino, for example benzylamino; alkoxy of 1–5 carbon atoms, such as methoxy or ethoxy; or alkylthio of 1–5 carbon atoms such as methylthio or ethylthio; a group of the formula

(in which y represents hydrogen, alkyl of 1–5 carbon atoms, halogen, nitro, hydroxy, dialkylamino of 1–5 carbon atoms in each alkyl moiety, or alkoxy of 1–5 carbon atoms), such as phenyl, p-methylphenyl, p-bromophenyl, p-nitrophenyl, m-nitrophenyl, p-hydroxyphenyl, p-dimethylaminophenyl or p-methoxyphenyl; and R" represents amino; or both R' and R" jointly may be an unsubstituted or substituted imino group such as imino.

It is therefore an object of this invention to provide a novel and advantageous process for preparing the 2-substituted cycloheptimidazole derivatives having the above Formula I, which are useful intermediates of highly active analgesic and anti-inflammatory agents.

Other objects of this invention will become apparent from the following description.

In carrying out the process according to this invention, the reaction may be preferably conducted in a suitable solvent. Representative examples of the suitable solvent to be employed are inert organic solvents, such as alcohols, for example, methanol or ethanol, dioxane or aromatics, for example, benzene, toluene or xylenes; water; and aqueous-organic solvents, such as aqueous-methanol or -ethanol.

In general, the reaction in the process according to this invention may be most preferably carried out at a temperature ranging from room temperature to a reflux temperature of the solvent employed, but the reaction may satisfactorily proceed at a lower or more elevated temperature than the above temperature. The reaction time will mainly depend upon such factors as the reactants and/or the reaction temperature employed. Usually, completion of the reaction will require the reaction period ranging from about 1 hour to 24 hours.

The reactants, the 2-alkoxy troponeimine derivatives having the above Formula II and the compounds having the above Formula III, may be in the form of a free base or an acid addition salt. Where the reactant is employed in the form of an acid addition salt, the acid addition salt may be converted to the corresponding free base by the treatment with an alkaline substance, before such reactant will be introduced into the reaction system. Alternatively, in this case, the acid addition salt may be employed in situ together with a sufficient amount of an alkaline substance to convert it to the corresponding free base. Representative examples of alkaline substances which may be used are alkali metal hydroxides, such as sodium or potassium hydroxides, and alkali metal carbonates, such as sodium or potassium carbonates. Besides, when the above-mentioned inert organic solvent is employed, such alkali metal alkoxides as sodium ethoxide or sodium t-butoxide may also be employed.

Typical examples of the compounds having the above Formula III may include cyanamide, methylcyanamide, ethylcyanamide, phenylcyanamide, benzylcyanamide, guanidine, dimethylguanidine, diethylguanidine, benzamidine, p-, o-, and m-methylbenzamidines, p-, o-, and m-nitrobenzamidines, p-, o-, and m-bromo (and chloro) benzamidines, p-, o-, and m-hydroxylbenzamidines, p-, o-, and m-dimethylbenzamidines, p-, o-, and m-methoxybenzamidines, O-methylisourea, O-ethylisourea, O-n-propylisourea, S-methylisothiourea, S-ethylisothiourea and S-isopropylisothiourea. Where cyanamide is employed as a reagent. it may be in the form of a free base or an acid addition salt as indicated hereinabove. Moreover, cyanamide may preferably be employed in the form of an alkali metal or alkaline earth metal salt thereof, such as sodium potassium, calcium and barium cyanamides and calcium cyanamide is most preferable because of its ready availability.

After completion of the reaction, the reaction product may be recovered from the reaction mixture by any of the conventional methods. For instance, after completion of the reaction, where the reaction product exists in the reaction mixture, the reaction mixture is filtered, the filtrate is concentrated and then the residue is subjected to alumina-chromatography or recrystallization from such suitable solvents as alcohols, benzene or cyclohexane to obtain the desired product, and where the reaction is carried out in the above-mentioned inert organic solvent, the reaction mixture is extracted with a suitable dilute acid such as dilute hydrochloric acid, the acid extract is made alkaline and then the reaction product thus separated is recovered by filtration and, if desired, the reaction product thus obtained may be further purified by recrystallization from a suitable solvent such as alcohols, benzene or cyclohexane.

The following examples are given for the illustration of this invention, not by way of limiting the scope thereof.

EXAMPLE 1

To 30 ml. of an aqueous solution containing 14.4 g. of 2-methoxytroponeimine monomethylsulfate is added 7 g. of a 30% aqueous solution of cyanamide and the pH of the mixture is adjusted to pH 12.0 with a 30% aqueous sodium hydroxide solution. The alkaline mixture is stirred for 1 hour on a water bath at 45–50 C., whereby a crystalline substance is separated which is collected, after cooling, by filtration, and thereafter washed with water. The filtrate is neutralized with dilute hydrochloric acid and concentrated to yield an additional small amount of a crystalline substance. The combined crystalline substance is recrystallized from methanol to give 4.8 g. of 2-aminocycloheptimidazole, melting at 295° C. (decomp.).

EXAMPLE 2

To 30 ml. of a methanolic solution containing 6.7 g. of 2-methoxytroponeimine is added dropwise with stirring a solution of 2.1 g. of cyanamide in 10 ml. of ethanol at 5–10° C. Thereafter, the mixture is maintained at room temperature for 1 hour and then refluxed for one additional hour. After completion of the reaction, the reaction mixture is cooled, the crystalline substance thus separated is recovered by filtration, and then washed with a small amount of ethanol to give 4.7 g. of 2-aminocycloheptimidazole, melting at 295° C. (decomp.).

EXAMPLE 3

To 116 g. of a 30% aqueous solution of 2-methoxytroponeimine monomethylsulfate is added 30 g. of calcium cyanamide, the mixture is stirred at room temperature for 6 hours and then allowed to stand overnight. After completion of the reaction, the reaction mixture is made acidic with dilute hydrochloric acid, the insoluble material is filtered off, and the filtrate is neutralized with aqueous sodium hydroxide, whereby a crystalline substance is separated. The substance is recovered by filtration, washed with water and recrystallized from methanol to give 10 g. of 2-aminocycloheptimidazole, melting at 295° C. (decomp.).

EXAMPLE 4

To 20 ml. of an ethanolic solution containing 2.1 g. of 2-methoxy-5-bromotroponeimine is added 0.6 g. of cyanamide and the mixture is refluxed for 3 hours. After completion of the reaction, the solvent is distilled off under reduced pressure, 10% hydrochloric acid is added to the residue, the insoluble material is filtered off, the acidic filtrate is neutralized with aqueous sodium hydroxide. The crystalline material thus separated is recovered by filtration and recrystallized from ethanol to give 1.3 g. of 2-amino-6-bromocycloheptimidazole, melting at 249° C.

EXAMPLE 5

To a solution of 0.6 g. of 2-methoxy-6-isopropyltroponeimine in 20 ml. of ethanol is added 2 g. of cyanamide and the reaction mixture is refluxed for 6 hours. After completion of the reaction, the reaction mixture is concentrated under reduced pressure, 10% hydrochloric acid is added to the residue and the insoluble material is filtered off. The filtrate is made alkaline with aqueous sodium hydroxide. The crystalline substance which precipitates is recovered by filtration, washed with water and then recrystallized from ethanol to give 0.3 g. of 2-amino-5-isopropyl-cycloheptimidazole, melting at 229° C.

EXAMPLE 6

To 20 ml. of an ethanolic solution containing 2.1 g. of 2-methoxy-7-phenyltroponeimine is added 0.6 g. of cyanamide, and the mixture is refluxed for 3 hours. After completion of the reaction, the reaction mixture is treated in the same way as in Example 4 to give 1.0 g. of 2-amino-4-phenylcycloheptimidazole, melting at 224–225° C.

EXAMPLE 7

To 27 ml. of an ethanolic solution containing 2.7 g. of 2-methoxytroponeimine in ethanol is added 1.4 g. of methylcyanamide and the mixture is allowed to stand at room temperature overnight and then refluxed for 2 hours. After completion of the reaction, the reaction mixture is treated in the same way as in Example 4 to give 0.5 g. of 2-methylaminocycloheptimidazole, melting at 174° C.

EXAMPLE 8

To 27 ml. of an ethanolic solution containing 2.7 g. of 2-methoxytroponeimine is added 3.1 g. of benzylcyanamide and the mixture is allowed to stand at room temperature overnight and then refluxed for 2 hours. After completion of the reaction, the reaction mixture is treated in the same way as in Example 4 to give 0.6 g. of 2-benzyl-aminocycloheptimidazole, melting at 175° C.

EXAMPLE 9

To a solution of 1.4 g. of 2-methoxytroponeimine in 14 ml. of ethanol is added 1.8 g. of phenylcyanamide and the mixture is refluxed for 6 hours. After completion of the reaction, the reaction mixture is cooled, the solvent is distilled off under reduced pressure, 10% hydrochloric acid is added to the residue, and then the insoluble material is filtered off from the resultant mixture. The filtrate is neutralized with aqueous sodium hydroxide. The crystalline substance which precipitates is recovered by filtration, washed with water and then recrystallized from ethanol to give 0.9 g. of 2-anilinocycloheptimidazole, melting at 239° C.

EXAMPLE 10

To a solution of 1.0 g. of metallic sodium in 40 ml. of absolute ethanol is added 4.3 g. of guanidine hydrochloride and then a solution of 5.0 g. of 2-methoxytroponeimine in 50 ml. of ethanol. The mixture is refluxed for 7 hours. After completion of the reaction, the reaction mixture is concentrated under reduced pressure and to the residue is added water. The crystalline substance which precipitates is recovered by filtration, washed with hot ethanol and then recrystallized from methanol to give 2.8 g. of 2-aminocycloheptimidazole, melting at 295° C. (decomp.).

EXAMPLE 11

To a solution of 0.35 g. of metallic sodium in 20 ml. of absolute ethanol is added 2.0 g. of dimethylguanidine sulfate and then a solution of 2.2 g. of 2-methoxytroponeimine in 20 ml. of ethanol. The mixture is refluxed for 4 hours. After completion of the reaction, the reaction mixture is concentrated under reduced pressure, water is added to the residue and then the mixture is extracted with benzene. The benzene extract is dried over anhydrous sodium sulfate and concentrated. The residue is chromatographed on alumina to yield a crystalline substance, which is then washed with a small amount of ether followed by recrystallization from cyclohexane to give 0.8 g. of 2-dimethylaminocycloheptimidazole as yellow leaves, melting at 136° C.

EXAMPLE 12

To a solution of 2.5 g. of metallic sodium in 60 ml. of absolute ethanol is added 13.6 g. of O-ethylisourea hydrochloride and then a solution of 13.5 g. of 2-methoxytroponeimine in ethanol with stirring. The mixture is stirred at room temperature for about 2 hours and then allowed to stand overnight. After completion of the reaction, the insoluble material is filtered off from the reaction mixture, the filtrate is concentrated under reduced pressure, the residue is dissolved in benzene and then the insoluble material is filtered off. The filtrate is chromatographed on alumina to yield 1.2 g. of 2-ethoxycycloheptimidazole, which melts at 99–100° C. after recrystallization from cyclohexane.

EXAMPLE 13

To a solution of 0.25 g. of metallic sodium in 10 ml. of absolute ethanol is added 1.4 g. of O-ethylisourea hydrochloride and then to the resulting mixture is added with stirring a solution of 2.1 g. of 2-methoxy-5-bromo-troponeimine in ethanol. The mixture is stirred for about 2 hours and allowed to stand at room temperature overnight. After completion of the reaction, the insoluble material is filtered off, the filtrate is concentrated under reduced pressure and then a solution of the residue in benzene is chromatographed on alumina to give 0.2 g. of 2 - ethoxy - 6 - bromocycloheptimidazole, melting at 140–141° C. In the same way as described above, there is obtained 2-ethoxy-6-ethoxy-cycloheptimidazole, melting at 120° C.

EXAMPLE 14

To a solution of 0.25 g. of metallic sodium in 10 ml. of ethanol is added 1.4 g. of O-ethylisourea hydrochloride and to the resulting mixture is added a solution of 1.8 g. of 2-methoxy-5-nitrotroponeimine in ethanol. The mixture is stirred at room temperature for about 2 hours and then allowed to stand overnight. After completion of the reaction, the insoluble material is filtered off, the filtrate is concentrated under reduced pressure and then the crystalline substance which separates is subjected to a fractional recrystallization to give 0.2 g. of 2-ethoxy-6-nitrocycloheptimidazole as orange-yellow scales melting at 161–162° C.

EXAMPLE 15

To a solution of 1.5 g. of S-methylisothiourea sulfate and 0.25 g. of metallic sodium in 10 ml. of ethanol is added a solution of 1.4 g. of 2-methoxytroponeimine in ethanol. The resulting mixture is stirred at room temperature for about 2 hours and then allowed to stand overnight. After completion of the reaction, the insoluble material is filtered off, the filtrate is concentrated under reduced pressure and benzene is added to the residue. The benzene solution is subjected to alumina-chromatography to give 0.8 g. of 2-methylthiocycloheptimidazole as pale yellow crystals melting at 100–102° C.

EXAMPLE 16

To a solution of 2.4 g. of 2-methoxytroponeimine in 30 ml. of ethanol is added a solution of 0.57 g. of metallic sodium in absolute ethanol and then a suspension of 4.1 g. of benzamidine hydrochloride in 20 ml. of ethanol. The mixture is refluxed for 7 hours. After completion of the reaction, the reaction mixture is cooled, filtered and then the filtrate is concentrated under reduced pressure. A solution of the residue in chloroform is extracted with 5% hydrochloric acid, the acid extract is treated with decolorizing charcoal and neutralized with aqueous sodium hydroxide. The crystalline substance which precipitates is recovered by filtration and washed with water followed by recrystallization from cyclohexane to give 2.8 g. of 2-phenylcycloheptimidazole, melting at 160° C.

In the same way as described above, there is obtained 2-phenyl-6-bromocycloheptimidazole, melting at 221° C.

EXAMPLE 17

To a solution of 2.5 g. of 2-methoxytroponeimine in 30 ml. of ethanol is added a solution of 0.57 g. of metallic sodium in absolute ethanol and then a suspension of 4.2 g. of p-methylbenzamidine hydrochloride in 20 ml. of ethanol. The resulting mixture is refluxed for 15 hours. After completion of the reaction, the reaction mixture is cooled, filtered and the filtrate is concentrated. A solution of the residue in chloroform is extracted with 5% hydrochloric acid. The acid extract is treated with decolorizing charcoal and neutralized with aqueous sodium hydroxide. The crystalline substance which precipitates is recovered by filtration, washed with a small amount of acetone and recrystallized from benzene to give 1.8 g. of 2-(p-methylphenyl)cycloheptimidazole, melting at 181° C.

In the same way as described above, the following cycloheptimidazoles are prepared:

2-(p-bromophenyl)cycloheptimidazole (melting point, 204° C.),
2-(p-methoxyphenyl)cycloheptimidazole (melting point, 160° C.),
2-(p-dimethylaminophenyl)cycloheptimidazole (melting point, 248° C.).

EXAMPLE 18

To a solution of 2.5 g. of 2-methoxytroponeimine in 30 ml. of ethanol is added a solution of 0.6 g. of metallic sodium in absolute ethanol and then a suspension of 5 g. of p-nitrobenzamidine hydrochloride in 30 ml. of ethanol. The resulting mixture is refluxed for 15 hours. After completion of the reaction, the reaction mixture is treated in the same way as in Example 16 to give 1.4 g. of 2-(p-nitrophenyl)cycloheptimidazole, melting at above 280° C.

In the same way as described above, the following cycloheptimidazoles are prepared;

2-(m-nitrophenyl)cycloheptimidazole (melting at 267° C.) and
2-(m-nitrophenyl)-5-isopropylcycloheptimidazole (melting at 163° C.).

What is claimed is:
1. A process for preparing a compound having the formula

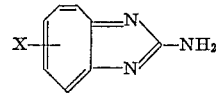

wherein X represents hydrogen, alkyl of 1–5 carbon atoms, phenyl, halogen, nitro or alkoxy of 1–5 carbon atoms which comprises reacting a compound having the formula

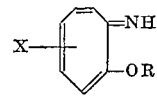

wherein X is as defined above and R represents alkyl of 1–5 carbon atoms with cyanamide or an alkali or alkaline earth metal salt thereof.

2. The process according to claim 1 wherein the said salt is calcium cyanamide.

References Cited

UNITED STATES PATENTS 3,320,272   5/1967   Sunagawa et al. _____ 260—309

FOREIGN PATENTS 8,416   4/1965   Japan.

OTHER REFERENCES

Nakao et al.: Chem. Pharm. Bull., vol 13, pp. 465–72 (April 1965).

Nozoe et al.: Bull. Chem. Soc. (Japan), vol 35, pp. 1188–94 (1962).

Soma et al.: Chem. Pharm. Bull., vol. 13, pp. 457–64 (April 1965).

Soma et al.: Chem. Pharm. Bull, vol. 13, pp. 819–28 (July 1965).

HENRY R. JILES, Primary Examiner

N. TROUSOF, Assistant Examiner

U.S. Cl. X.R.

260—453, 564, 565, 566, 999